(12) United States Patent
Shatunov et al.

(10) Patent No.: US 10,170,794 B2
(45) Date of Patent: Jan. 1, 2019

(54) ELECTROLYTE ADDITIVE FOR LITHIUM BATTERY, ELECTROLYTE FOR LITHIUM BATTERY, AND LITHIUM BATTERY INCLUDING THE ELECTROLYTE ADDITIVE

(71) Applicant: Samsung SDI Co., Ltd., Yongin-si, Gyeonggi-do (KR)

(72) Inventors: Pavel Alexandrovich Shatunov, Yongin-si (KR); Soojin Kim, Yongin-si (KR); Seungtae Lee, Yongin-si (KR); Minju Lee, Yongin-si (KR); Woocheol Shin, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 192 days.

(21) Appl. No.: 15/169,397

(22) Filed: May 31, 2016

(65) Prior Publication Data

US 2016/0351963 A1    Dec. 1, 2016

(30) Foreign Application Priority Data

Jun. 1, 2015 (KR) .......................... 10-2015-0077478

(51) Int. Cl.
*H01M 10/0567* (2010.01)
*H01M 10/0569* (2010.01)
*H01M 10/0525* (2010.01)

(52) U.S. Cl.
CPC ... *H01M 10/0567* (2013.01); *H01M 10/0525* (2013.01); *H01M 10/0569* (2013.01)

(58) Field of Classification Search
None
See application file for complete search history.

(56) References Cited

U.S. PATENT DOCUMENTS

| | | | | |
|---|---|---|---|---|
| 6,905,762 B1 * | 6/2005 | Jow et al. | ............... | H01M 6/16 428/332 |
| 2015/0364794 A1 * | 12/2015 | Nakazawa | ............ | H01M 4/587 429/200 |

FOREIGN PATENT DOCUMENTS

| | | | |
|---|---|---|---|
| CN | 101771167 A * | 7/2010 | |
| JP | 2012-134137 A | 7/2012 | |
| JP | 2012-190791 A | 10/2012 | |
| WO | WO-2014133107 A1 * | 9/2014 | ............ H01M 4/587 |

OTHER PUBLICATIONS

T. Richard Jow et al., "Electrolytes for Lithium and Lithium-Ion Batteries", *Modern Aspects of Electrochemistry*, 2014, pp. 2-3 and pp. 70-71, vol. 58, Springer-Verlag New York.

* cited by examiner

*Primary Examiner* — Daniel S Gatewood
(74) *Attorney, Agent, or Firm* — Knobbe, Martens, Olson & Bear, LLP (57) ABSTRACT

In an aspect, an electrolyte additive and an electrolyte for a lithium battery and a lithium battery including the electrolyte additive is provided. The electrolyte additive includes a sulfone compound wherein the sulfonyl group is directly bonded to a halide group and an electron withdrawing group.

18 Claims, 5 Drawing Sheets

ELECTROLYTE ADDITIVE FOR LITHIUM BATTERY, ELECTROLYTE FOR LITHIUM BATTERY, AND LITHIUM BATTERY INCLUDING THE ELECTROLYTE ADDITIVE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of Korean Patent Application No. 10-2015-0077478, filed on Jun. 1, 2015, in the Korean Intellectual Property Office, the disclosure of which is incorporated herein in its entirety by reference.

BACKGROUND

Field

This disclosure relates to an electrolyte additive for a lithium battery, an electrolyte for a lithium battery, and a lithium battery including the electrolyte additive.

Description of the Related Technology

Lithium batteries are used as the driving source for portable electronic devices sources, such as camcorders, mobile phones, and laptop computers. Lithium secondary batteries are rechargeable at high rates and have a high energy density per unit weight of about three times higher than that of conventional lead storage batteries, nickel-cadmium (Ni—Cd) batteries, nickel-hydrogen batteries, and nickel-zinc batteries.

A lithium battery operating at a high driving voltage is incompatible with an aqueous electrolytic solution as it is highly reactive to lithium. For this reason, the lithium batteries mostly use an organic electrolytic solution. The organic electrolytic solution may be prepared by dissolving a lithium salt in an organic solvent. An appropriate organic solvent may be stable at high voltages and may have a high ionic conductivity, a high dielectric constant, and a low viscosity.

When a lithium battery uses a carbonate-based polar, non-aqueous solvent, an irreversible side reaction between an anode and/or a cathode and the electrolytic solution may occur during an initial charging process, and cause excess consumption of charges.

When a carbonate-based polar non-aqueous solvent is used in the lithium battery, the irreversible reaction using an excessive amount of charges may result in side reactions between an anode/cathode and an electrolyte during an initial charging process of the battery.

The irreversible reaction may also form a thick solid electrolyte interface layer (also, referred to as an SEI layer) formed of decomposition products of electrolyte components on the surface of an electrode, which results in an increase in the initial resistance of the lithium battery and a rapid loss in the cycle capacity retention rate. Thus, the cycle lifetime characteristics of the lithium battery may decrease. More specifically, high operation temperature and high operation voltage could result in severe electrolyte decomposition, and as a result can deteriorate the cycle lifetime characteristics of the lithium battery.

Therefore, there is a demand for an organic electrolyte solution with improved stability and cycle lifetime characteristics at high temperatures and high voltages.

SUMMARY

One or more embodiments include an additive for a lithium battery electrolyte, the additive having improved storage and lifetime characteristics at high temperatures.

One or more embodiments include an electrolyte for a lithium battery, the electrolyte including the additive.

One or more embodiments include a lithium battery including the electrolyte.

Additional aspects will be set forth in part in the description which follows and, in part, will be apparent from the description, or may be learned by practice of the presented embodiments.

According to one or more exemplary embodiments, an electrolyte additive for a lithium battery includes a sulfone compound wherein the sulfonyl group is directly bonded to a halide group and an electron withdrawing group.

The halide group may include at least one selected from the group consisting of F, Cl, Br, and I.

The electron withdrawing group may include at least one selected from an isocyanate group (—NCO), an isothiocyanate group (—NCS), a cyanate group (—OCN), a thiocyanate group (—SCN), a cyano group (—CN), an isocyano group (—NC), —N═C═N— group, and —N═S═N— group.

The sulfone compound may include at least one selected from compounds represented by Formula 1 and Formula 2:

Formula 1 wherein, in Formula 1,

X is —F, —Cl, —Br, or —I; and $Y^1$ is an isocyanate group (—NCO), an isothiocyanate group (—NCS), a cyanate group (—OCN), a thiocyanate group (—SCN), a cyano group (—CN), or an isocyano group (—NC), Formula 2 wherein, in Formula 2, $X^1$ and $X^2$ are each independently —F, —Cl, —Br, or —I; and $Y^2$ is —N═C═N— group or —N═S═N— group.

According to one or more exemplary embodiments, an electrolyte for a lithium battery includes a non-aqueous organic solvent; and the electrolyte additive.

An amount of the sulfone compound may be in a range of about 0.0015 wt % to about 5 wt % based on the total weight of the electrolyte.

According to one or more exemplary embodiments, a lithium battery includes the electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments of an electrolyte additive for a lithium battery, an electrolyte for a lithium battery including the electrolyte additive, and a lithium battery including the electrolyte, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment, the electrolyte additive for a lithium battery includes a sulfone compound wherein the sulfonyl group is directly bonded to a halide group and an electron withdrawing group (EWG).

As used herein, the term "alkyl" refers to a branched or unbranched aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, cyclopropyl, cyclopentyl, cyclohexyl, cycloheptyl and the like, each of which may be optionally substituted in some embodiments. In some embodiments, the alkyl may have from 1 to 6 carbon atoms. For example, $C_{1-6}$alkyl includes, but is not limited to, methyl, ethyl, propyl, isopropyl, butyl, iso-butyl, sec-butyl, pentyl, 3-pentyl, hexyl, and the like.

As used herein, the term "halogen," "halo," or "halide" refers to any one of the radio-stable atoms of column 7 of the Periodic Table of the Elements, e.g., fluorine, chlorine, bromine, or iodine, with fluorine and chlorine being preferred.

The halide group may include at least one selected from the group consisting of F, Cl, Br, and I.

The electron withdrawing group may include at least one selected from an isocyanate group (—NCO), an isothiocyanate group (—NCS), a cyanate group (—OCN), a thiocyanate group (—SCN), a cyano group (—CN), an isocyano group (—NC), —N=C=N—, and —N=S=N—.

When the additive of the electrolyte for a lithium battery includes the sulfone group, wherein the sulfonyl group is directly bonded to the halide group and the electron withdrawing group, such as an isocyanate group (—NCO), high temperature storage and lifetime characteristics of the lithium battery may improve.

The self-reduction voltage of the sulfone additive in the exemplary embodiment is increased compared to a sulfone additive devoid of electron withdrawing groups, hence it can reductively decompose at a higher starting voltage and thus it can be highly reactive with the anode. Therefore, the sulfone additive in the exemplary embodiment is reductively decomposed during the initial charging process of the battery which results in a stable, dense, and tight solid electrolyte interface (SEI) layer on a surface of an anode. As a result the irreversible capacity of the lithium battery may decrease, and thus improve the lifetime characteristics of the lithium battery at high temperature.

The reduction characteristics are mainly affected by an electronegativity of the substituents. Therefore, when an electron donating substituent is linked to a sulfone compound, reduction reaction may not occur since the reduction voltage of the compound decreases; whereas, in the case of the exemplary embodiment described above, when an electron withdrawing substituent is linked to the sulfone compound, the self-reduction voltage of the sulfone compound increases, and as a result the reduction reaction may easily occur at the anode.

Also, an isocyanate group (—N=C=O), an isothiocyanate group (—N=C=S), a cyanate group (—O—C≡N), a thiocyanate group (—S—C≡N), a cyano group (—C≡N), an isocyano group (—N$^+$≡C$^-$), —N=C=N— group, and —N=S=N— group introduced to the sulfone compound are highly chemically reactive and able to chemically react with components of SEI layer on anode containing, for example, Li alkoxide groups, or with HO-groups on the surface of carbonaceous or silicon anodes, making the SEI layer more robust and stable even at elevated temperatures, like 45° C. or higher.

Also, an isocyanate group (—N=C=O), an isothiocyanate group (—N=C=S), a cyanate group (—O—C≡N), a thiocyanate group (—S—C≡N), a cyano group (—C≡N), an isocyano group (—N$^+$≡C$^-$), —N=C=N— group, and —N=S=N— group covalently linked to the sulfone compound are electron withdrawing groups with high dipole moment. These functional groups strongly bond with a transition metal or a transition metal oxide exposed on the surface of a cathode active material, and thus a protection layer in the form of a complex may be formed. Therefore, during initial charging of the lithium battery, a more stable and dense inert layer may be formed while the sulfone compound wherein the sulfonyl group is covalently linked with the electron drawing group is adhered on a surface of the electrode, and the inert layer thus formed may strongly bond with the surface of the electrode active material, maintaining the stability of the inert layer after repeated charging/discharging processes. The battery may be continuously maintained, and thus a battery performance may be maintained.

In some embodiments, the sulfone compound may include at least one of compounds represented by Formula 1 and Formula 2.

Formula 1

In Formula 1,

X is —F, —Cl, —Br, or —I; and $Y^1$ is an isocyanate group (—NCO), an isothiocyanate group (—NCS), a cyanate group (—OCN), a thiocyanate group (—SCN), a cyano group (—CN), or an isocyano group (—NC).

Formula 2

In Formula 2, $X^1$ and $X^2$ are each independently —F, —Cl, —Br, or —I, $Y^2$ is —N=C=N— group or —N=S=N— group.

In some embodiments, the halide group in the sulfone compound may be a fluoride group (F), which has the highest electronegativity compared to other groups.

In some embodiments, the sulfone compound may include at least one of compounds below.

According to another exemplary embodiment, an electrolyte for a lithium battery includes a non-aqueous organic solvent and an additive including the sulfone compound described above.

When the electrolyte for a lithium battery includes the sulfone compound as the additive, a stable SEI layer may be formed on surfaces of a cathode and an anode, and thus high temperature stability of a lithium battery including the electrolyte may improve.

In some embodiments, an amount of the sulfone compound may be in a range of about 0.001 wt % to about 10 wt % based on the total weight of the electrolyte. For example, an amount of the sulfone compound may be in a range of about 0.005 wt % to about 5 wt %, about 0.01 wt % to about 1 wt %, or about 0.05 wt % to about 0.5 wt %. When the amount of the sulfone compound is within these ranges, lifetime characteristics of the lithium battery at high temperatures may improve.

The non-aqueous organic solvent used in the electrolyte may serve as a medium, through which ions involved in electrochemical reactions of the battery may migrate.

Examples of the non-aqueous organic solvent may include a carbonate-based compound, an ester-based compound, an ether-based compound, a ketone-based compound, an alcohol-based compound, an aprotic solvent, and a combination thereof.

Examples of the carbonate-based compound may include an acyclic carbonate compound, a cyclic carbonate compound, and a combination thereof.

Examples of the acyclic carbonate may include diethyl carbonate (DEC), dimethyl carbonate (DMC), dipropyl carbonate (DPC), methyl propyl carbonate (MPC), ethyl propyl carbonate (EPC), ethyl methyl carbonate (EMC), and a combination thereof.

Examples of the cyclic carbonate may include ethylene carbonate (EC), propylene carbonate (PC), butylene carbonate (BC), vinyl ethylene carbonate (VEC), and a combination thereof.

Examples of the ester-based compound may include methyl acetate, acetate, n-propyl acetate, dimethyl acetate, methyl propionate, ethyl propionate, γ-butyrolactone, decanolide, valerolactone, mevalonolactone, and caprolactone.

Examples of the ether-based compound may include dibutyl ether, tetraglyme, diglyme, dimethoxyethane, 2-methyltetrahydrofuran, and tetrahydrofuran.

Examples of the ketone-based compound may include cyclohexanone.

Examples of the alcohol-based compound may include ethylalcohol and isopropyl alcohol.

Examples of the aprotic solvent may include nitriles such as R—CN (where, R is a $C_2$-$C_{20}$ chain, branched, or cyclic hydrocarbon, a double bond, an aromatic ring, or an ether bond), amides such as dimethyl formamide (DMF), dimethyl acetamide (DMAC), dioxolanes such as 1,3-dioxolane, and sulfolanes. For example, dimethylsulfoxide, 1,2-dioxolane, sulfolane, methylsulfolane, 1,3-dimethyl-2-imidazolidinone, N-methyl-2-pyrrolidinone, formamide, dimethylformamide, acetonitrile, nitromethane, trimethyl phosphate, triethyl phosphate, trioctyl phosphate, and phosphate triester.

The non-aqueous organic solvent may be used alone or in a mixture. When the organic solvent is used in a mixture, a mixing ratio may be appropriately controlled in accordance with a desirable battery performance.

Also, the carbonate-based solvent may include a mixture of a cyclic carbonate and an acyclic carbonate. The cyclic carbonate and the acyclic carbonate are mixed together in a volume ratio of about 1:1 to about 1:9 to increase performance of an electrolyte solution including the carbonate-based solvent.

The non-aqueous organic solvent may further include the aromatic hydrocarbon-based organic solvent in the carbonate-based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon compound represented by Formula 3:

Formula 3

In Formula 3, $R_1$ to $R_6$ are each independently a hydrogen, a halogen, a $C_1$ to $C_{10}$ alkyl group, a $C_1$ to $C_{10}$ haloalkyl group, or a combination thereof.

The aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous organic solvent may include a vinylene carbonate or an ethylene carbonate-based compound represented by Formula 4 to improve lifespan of the battery.

Formula 4

In Formula 4, $R_7$ and $R_8$ are each independently a hydrogen, a halogen, a cyano group (CN), a nitro group ($NO_2$), or a $C_1$ to $C_5$ fluoroalkyl group, and at least one of $R_7$ and $R_8$ is a halogen, a cyano group (CN), a nitro group ($NO_2$) or a $C_1$ to $C_5$ fluoroalkyl group.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. When the vinylene carbonate or the ethylene carbonate-based compound is used, amounts of these compounds may be appropriately controlled to improve lifespan of the battery.

The electrolyte for a lithium battery may further include a lithium salt.

The lithium salt supplies lithium ions in the battery. The lithium salt may be any lithium salt used in a lithium battery. Examples of the lithium salt, which may be easily dissolved in the non-aqueous based electrolyte, may include at least one selected from LiCl, LiBr, LiI, $LiClO_4$, $LiB_{10}Cl_{10}$, $LiPF_6$, $CF_3SO_3Li$, $CH_3SO_3Li$, $C_4F_3SO_3Li$, $(CF_3SO_2)_2NLi$, $LiN(C_xF_{2x+1}SO_2)(C_yF_{2+y}SO_2)$ (where, x and y are each independently integers between 1 to 5), $CF_3CO_2Li$, $LiAsF_6$, $LiSbF_6$, $LiAlCl_4$, $LiAlF_4$, lithium chloroborate, lower aliphatic (e.g. $C_1$-$C_5$ alkyl groups) lithium carbonate, lithium tetraphenyl borate, and lithium imide.

A concentration of the lithium salt may be, for example, in a range of about 0.1 M to about 2.0 M in order to secure practical performance of the lithium battery.

The electrolyte for a lithium battery may further include an additional additive that contributes formation of a stable SEI or film on an electrode surface in order to improve electrochemical characteristics of the electrolyte.

Examples of the additional additive may include tris(trimethylsilyl)phosphate (TMSPa), lithium difluorooxalatoborate (LiFOB), vinylene carbonate (VC), propanesultone (PS), succinonitrile (SN), $LiBF_4$, a silane compound having a functional group that may form a siloxane bond with, for example, an acryl group, an amino group, an epoxy group, a methoxy group, or a vinyl group, and silazanes such as hexamethyldisilazane. The additives may be used alone or may be added as a combination of at least two selected therefrom.

According to another exemplary embodiment, provided is a cathode including the cathode active material, and a method of manufacturing the cathode will be described along with a method of manufacturing a lithium battery.

The lithium battery according to another embodiment includes a cathode including the cathode active material; a anode facing the cathode; and an electrolyte disposed between the cathode and the anode.

The cathode includes the cathode active material. For example, the cathode may be manufactured by preparing a cathode active material composition by mixing the cathode active material, a conducting agent, and a binder in a solvent; and molding the cathode active material composition in a predetermined shape or coating the cathode active material composition on a current collector such as a copper foil.

The conducting agent included in the cathode active material composition may increase the electrical conductivity by providing a conduction pathway to the cathode active material. The conducing agent may be any conducting material generally used in a lithium battery. Examples of the conducting agent may include a carbon-based material such as carbon black, acetylene black, ketjen black, or carbon fiber (e.g., vapor growth carbon fiber); a metal-based material such as a metal powder or metal fiber of copper, nickel, aluminum, or silver; a conductive polymer such as a polyphenylene derivative; or a conducting material including a mixture thereof. An amount of the conducting agent may be appropriately controlled. For example, a weight ratio of the cathode active material and the conducting agent may be in a range of about 99:1 to about 90:10.

The binder included in the cathode active material composition contributes in binding of the cathode active material and the conducting agent and binding of the cathode active material to the current collector, and an amount of the binder may be in a range of about 1 part to about 50 parts by weight based on 100 parts by weight of the cathode active material. For example, an amount of the binder may be in a range of about 1 part to about 30 parts by weight, for example, about 1 part to about 20 parts by weight, or about 1 part to about 15 parts by weight, based on 100 parts by weight of the cathode active material. Examples of the binder may include various polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, or a combination thereof, but embodiments are not limited thereto.

Examples of the solvent may include N-methylpyrrolidone (NMP), acetone, and water. An amount of the solvent may be in a range of about 1 part to about 100 parts by weight based on 100 parts by weight of the cathode active material. When the amount of the solvent is within this range, an active material layer may be easily formed.

Also, the thickness of the current collector may be in a range of about 3 μm to about 500 μm, and may be any of various current collectors that do not cause a chemical change to a battery and have high conductivity. Examples of the current collector for a cathode may include stainless steel, aluminum, nickel, titanium, calcined carbon, and copper and stainless steel that are surface-treated with carbon, nickel, titanium, or silver. The current collector for a cathode may have an uneven microstructure at its surface to enhance the binding force with the cathode active material. Also, the current collector may be used in various forms including a film, a sheet, a foil, a net, a porous body, a foaming body, a non-woven body.

The cathode active material composition may be directly coated on a current collector, or the cathode active material composition may be cast on a separate support to form a cathode active material film, which may then be separated from the support and laminated on a copper foil current collector to prepare a cathode plate, but embodiments to prepare the cathode are not limited thereto.

The cathode active material composition may be printed on a flexible electrode substrate to manufacture a printable battery, in addition to the use in manufacturing a lithium battery.

Separately, for the manufacture of a anode, a anode active material composition is prepared by mixing a anode active material, a binder, a solvent, and, optionally, a conducting agent.

The anode active material may be any material that is generally used in the art. Examples of the anode active material may include lithium metal, a metal that is alloyable with lithium, a transition metal oxide, a material capable of doping and de-doping lithium, and a material capable of reversibly intercalating and deintercalating lithium ions.

Examples of the transition metal oxide may include a tungsten oxide, a molybdenum oxide, a titanium oxide, a lithium titanium oxide, a vanadium oxide, and a lithium vanadium oxide.

Examples of the material capable of doping and de-doping lithium may include Si; $SiO_x$ (where, $0<x<2$); a Si—Y alloy (where, Y is an alkali metal, an alkali earth metal, a Group 13 element, a Group 14 element, a Group 15 element, a Group 16 element, a transition metal, a rare-earth element, or a combination thereof, but not Si); Sn; $SnO_2$; and a Sn—Y alloy (where, Y is an alkali metal, an alkali earth metal, a Group 13 element, a Group 14 element, a Group 15 element, a Group 16 element, a transition metal, a rare-earth element, or a combination thereof, but not Sn). Also, at least one of the materials capable of doping and de-doping lithium may be used in combination with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversibly intercalating and deintercalating lithium ions may be any one of various carbon-based materials that are generally used in a lithium battery. Examples of the material capable of reversibly intercalating and deintercalating lithium ions may include crystalline carbon, amorphous carbon, and a mixture thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (low-temperature calcined carbon), hard carbon, meso-phase pitch carbide, and calcined cokes.

The conductive agent, the binder, and the solvent included in preparing the anode active material composition may be the same with those included in the cathode active material composition. In some cases, a plasticizer may be further added to the cathode active material composition and to the anode active material composition in order to form pores in a corresponding electrode plate. Amounts of the anode active material, the conducting agent, the binder, and the solvent may be at the same levels used in a conventional lithium battery.

A anode current collector may have a thickness of about 3 μm to about 500 μm, and may be any of various current collectors that do not cause a chemical change to a battery and has high conductivity. Examples of the current collector for the anode may include stainless steel, aluminum, nickel, titanium, calcined carbon, and aluminum and stainless steel that are surface-treated with carbon, nickel, titanium, or silver. The current collector for the anode may have an uneven microstructure at its surface to enhance a binding force with the anode active material. Also, the current collector may be used in various forms including a film, a sheet, a foil, a net, a porous body, a foaming body, a non-woven body.

The anode active material thus prepared may be directly coated on the current collector for a anode to form a anode plate, or may be case onto a separate support and a anode active material film separated from the support is laminated on the current collector for a anode.

The cathode and the anode may be separated by a separator, and the separator may be any of various separators that are typically used in a lithium battery. In particular, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 μm to about 10 μm, and a thickness in a range of about 5 μm to about 300 μm.

A lithium salt-containing non-aqueous based electrolyte solution includes a non-aqueous electrolyte and a lithium salt. Examples of the non-aqueous electrolyte may include a non-aqueous electrolyte solution, a solid electrolyte, and an inorganic solid electrolyte.

The non-aqueous electrolyte solution may be a non-aprotic organic solvent, and examples of the non-aprotic organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt may be any lithium salt that is commonly used in a lithium battery, and that it is soluble in the lithium salt-containing non-aqueous electrolyte. For example, the lithium salt may include at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, and lithium imide.

Lithium batteries may be classified as lithium ion batteries, lithium ion polymer batteries, and lithium polymer batteries according to the types of a separator and an electrolyte used therein. In addition, lithium batteries may be classified as a cylindrical type, a rectangular type, a coin type, and a pouch type according to a battery shape, and may also be classified as a bulk type and a thin type according to a battery size. Lithium batteries may be also used either as primary lithium batteries or secondary lithium batteries.

A method of manufacturing a lithium battery is widely known in the art, and thus detailed description thereof will not be provided herein.

Figure 1:
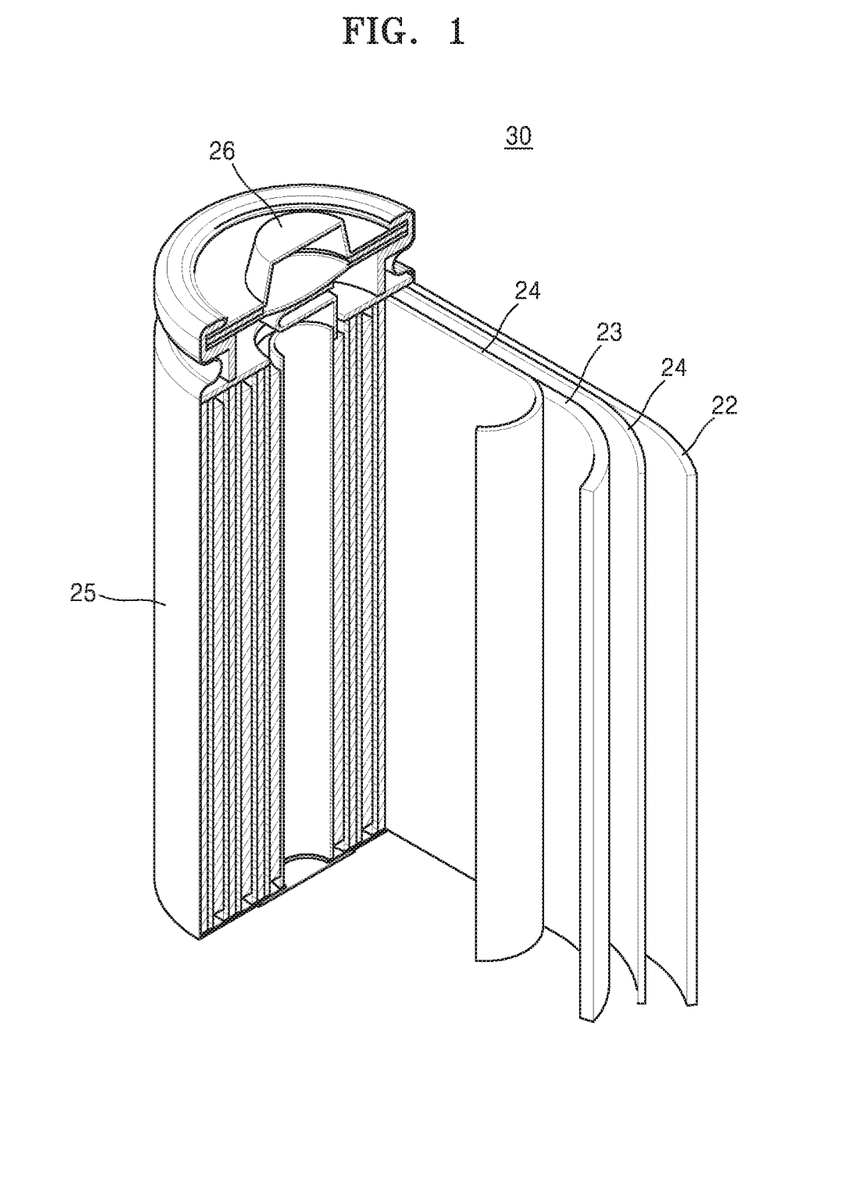
FIG. 1 is a schematic view of a lithium battery according to an exemplary embodiment.

FIG. 1 is a schematic diagram illustrating a structure of a lithium battery according to an exemplary embodiment.

Referring to FIG. 1, the lithium battery 30 includes a cathode 23, a anode 22, and a separator 24 disposed between the cathode 23 and the anode 22. In some embodiments the, cathode 23, the anode 22, and the separator 24 may be wound or folded, and then accommodated in a battery case 25. In some embodiments, an electrolyte is injected into the battery case 25, and the battery case 25 is sealed by a sealing member 26, thereby completing the manufacture of the lithium battery 30. In some embodiments, the battery case 25 may have a cylindrical shape, a rectangular shape, or a thin-film shape. For example, the lithium battery may be a thin-film type battery. In some embodiments, the lithium battery 30 may be a lithium ion battery.

In some embodiments, the lithium battery may be suitable to be used as a battery, as power sources, of small-sized devices such as mobile phones or portable computers, or as a unit battery of a battery module including a plurality of batteries in a medium-to-large-sized device.

Examples of the medium-to-large-sized device may include a power tool; an xEV such as electric vehicle (EV), hybrid electric vehicle (HEV), and plug-in hybrid electric vehicle; electric bicycles such as E-bike or E-scooter; an electric golf cart; an electric truck; an electric commercial vehicle; or an electric power storage system, but embodiments are not limited thereto. Also, the lithium battery may be suitable for use requiring a high output, a high voltage, and high temperature operability.

One or more embodiments of the present disclosure will now be described in more detail with reference to the following examples. However, these examples are not intended to limit the scope of the one or more embodiments of the present disclosure.

Example 1-1

$LiPF_6$ was added to a mixture of solvents including ethylene carbonate (EC), ethyl methyl carbonate (EMC), and dimethyl carbonate (DMC) in a volume ratio of 20:40:40 so that a concentration of $LiPF_6$ in the mixture was 1.15 M. Fluorosulfonyl isocyanate was added as an additive to the mixture solvent in an amount of 0.2 wt % to prepare an electrolyte.

A cathode active material powder including 90 wt % of $LiNi_{0.33}Co_{0.33}Mn_{0.33}O_2$ and 10 wt % of $LiNi_{0.85}Co_{0.1}Al_{0.05}O_2$ and a carbon conducting agent (Super-P available from Timcal Ltd., Bodio, Switzerland) were homogenously mixed in a weight ratio of 90:5, and then a polyvinylidene fluoride (PVDF) binder solution was added thereto to prepare a cathode active material slurry so that the cathode active material, the carbon conducting agent, and the binder have a weight ratio of 90:5:5. The cathode active material slurry was coated on an aluminum foil having a thickness of about 15 μm, and the foil was dried and roll-pressed to prepare a cathode.

Lithium metal was used as a counter electrode, a polypropylene separator (Celgard 3501, Celgard, LLC., North Carolina, USA) having a thickness of about 20 μm was used, and the electrolyte was injected thereto to prepare a compressed 2016-type cathode coin half-cell.

Example 1-2

$LiPF_6$ was added to a mixture solvent including ethylene carbonate (EC), ethyl methylcarbonate (EMC), and dimethyl carbonate (DMC) at a volume ratio of 20:40:40 so that a concentration of $LiPF_6$ in the mixture was 1.15 M. Fluorosulfonyl isocyanate was added as an additive to the mixture solvent at an amount of 0.2 wt % to prepare an electrolyte.

However, a graphite powder (MC20) and a PVDF binder were mixed to have a weight ratio of 1:1, and N-methylpyrrolidone was added to the mixture to control the viscosity so that an amount of solid in the mixture was 60 wt %, and thus an anode active material slurry was prepared. The anode active material slurry was coated on a copper foil having a thickness of about 15 μm, and the foil was dried and roll-pressed to prepare an anode.

Lithium metal was used as a counter electrode, a polypropylene separator (Celgard 3501, Celgard, LLC., North Carolina, USA) having a thickness of about 20 μm was used, and the electrolyte was injected thereto to prepare a compressed 2016-type anode coin half-cell.

Comparative Example 1-1

A cathode coin-half cell was prepared in the same manner as in Example 1-1, except that fluorosulfonylisocyanate was not added.

Comparative Example 1-2

A anode coin-half cell was prepared in the same manner as in Example 1-2, except that fluorosulfonylisocyanate was not added.

Evaluation Example 1: Cyclic Voltammetric Analysis

Cyclic voltammetric analysis was performed on the coin-half cells prepared in Examples 1-1 and 1-2 and Comparative Examples 1-1 and 1-2 by using a M273A constant potential/constant current meter (EG&G PAR, Princeton, N.J.).

The analysis conditions included a voltage range for a first cycle within 3.0 V to 4.4 V, a scanning rate of 0.2 mV/s for Example 1-1 and Comparative Example 1-1, and a voltage range for a first cycle within 0 V to 3.0 V and a scanning rate of 1.0 mV/s for Example 1-2 and Comparative Example 1-2. The measuring principle included observation of voltage change while supplying a constant current.

Figure 2:
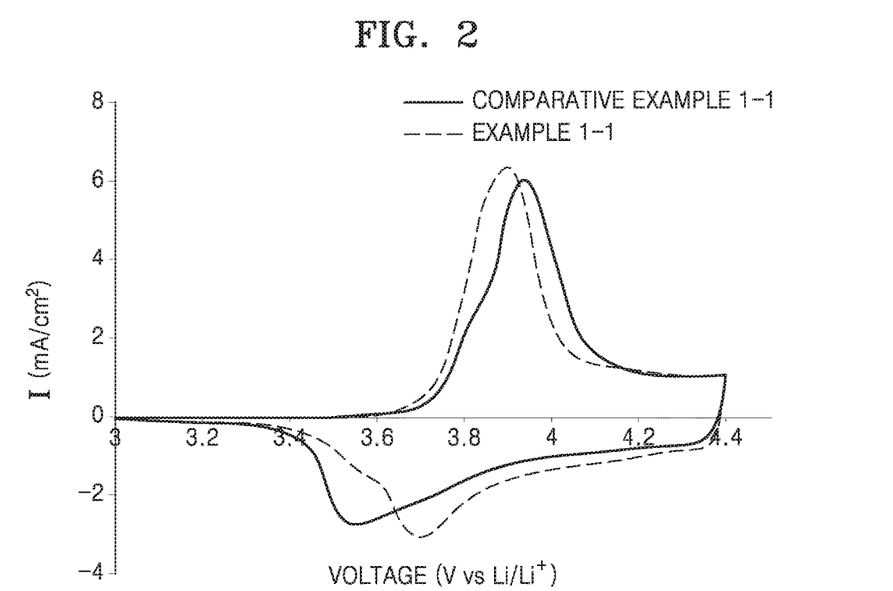
FIG. 2 shows results of a cyclic voltammetric analysis of cathode coin half-cells prepared in Example 1-1 and Comparative Example 1-1.
Figure 3:
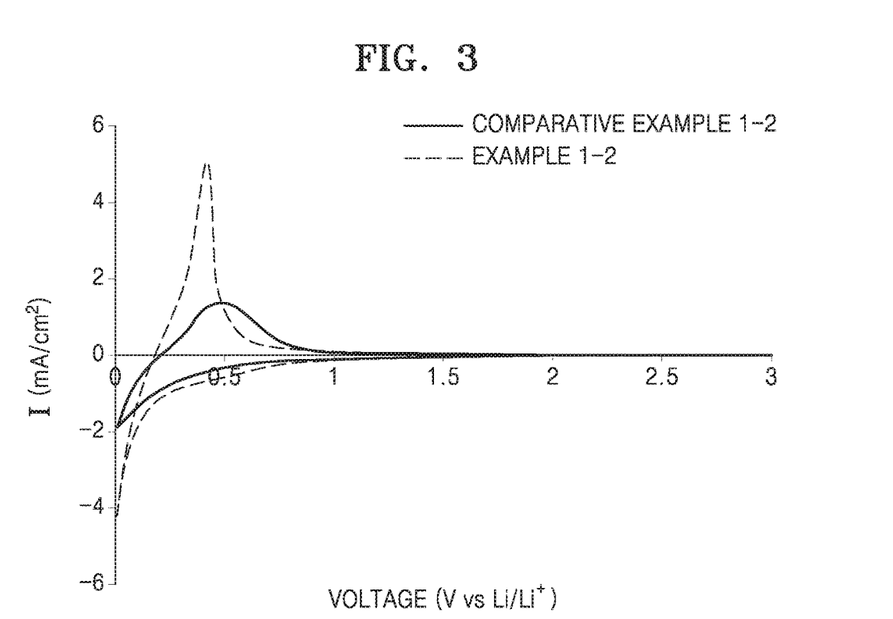
FIG. 3 shows results of cyclic voltammetric analysis of anode coin half-cells prepared in Example 1-2 and Comparative Example 1-2.

The results of the cyclic voltammetric analysis performed on the cathode coin half-cells prepared in Example 1-1 and Comparative Example 1-1 are shown in FIG. 2, and the results of the cyclic voltammetric analysis performed on the anode coin half-cells prepared in Example 1-2 and Comparative Example 1-2 are shown in FIG. 3.

As shown in FIGS. 2 and 3, a lithiation-delithiation process at an electrode, particularly, at an anode, was facilitated in the lithium batteries including fluorosulfonylisocyanate as the additive in the electrolyte compared to those lacking the additive.

Example 2

$LiPF_6$ was added to a mixture solvent including ethylene carbonate (EC), ethyl methyl carbonate (EMC), and dimethyl carbonate (DMC) at a volume ratio of 20:40:40 so that a concentration of $LiPF_6$ in the mixture was 1.15 M. Fluorosulfonyl isocyanate was added as an additive to the mixture solvent at an amount of 0.2 wt % to prepare an electrolyte.

A cathode active material powder including 90 wt % of $LiNi_{0.33}Co_{0.33}Mn_{0.33}O_2$ and 10 wt % of $LiNi_{0.85}CO_{0.1}Al_{0.05}O_2$ and a carbon conducting agent (Super-P available from Timcal Ltd., Bodio, Switzerland) were homogenously mixed at a weight ratio of 90:5, and then a polyvinylidene fluoride (PVDF) binder solution was added thereto to prepare a cathode active material slurry so that the cathode active material, the carbon conducting agent, and the binder have a weight ratio of 90:5:5. The cathode active material slurry was coated on an aluminum foil having a thickness of about 15 μm, and the foil was dried and roll-pressed to prepare a cathode.

Also, a graphite powder (MC20) and a PVDF binder were mixed to have a weight ratio of 1:1, and N-methylpyrrolidone was added to the mixture to control a viscosity so that an amount of solid in the mixture was 60 wt %, and thus an anode active material slurry was prepared. The anode active material slurry was coated on a copper foil having a thickness of about 15 μm, and the foil was dried and roll-pressed to prepare an anode.

The cathode and the anode thus prepared and a polyethylene separator (STAR20, available from Asahi Kasei, Tokyo, Japan) having a thickness of about 20 μm were used, and the electrolyte was injected thereto to prepare a 18650-type mini full-cell.

Comparative Example 2

A mini full-cell was prepared in the same manner as in Example 2, except that fluorosulfonyl isocyanate was not added.

Evaluation Example 2: Evaluation of High Temperature Storage Characteristics High temperature storage characteristics of the mini full-cells prepared in Example 2 and Comparative Example 2 were measured as follows.

The mini full-cell was charged at a constant current of 0.2 C rate until a voltage reached about 4.2 V and discharged at a constant current of 0.2 C rate until a voltage reached about 2.8 V at a temperature of 25° C. Next, the cell was charged at a constant current of 0.5 C rate until a voltage reached about 4.2 V, and, while maintaining the voltage at 4.2 V, the cell was charged at a constant voltage until a current reached 0.05 C. Then, the cell was discharged at a constant current of 0.5 C until a voltage reached about 2.8 V (formation process).

The mini-full cell after the formation process was stored in a high temperature chamber at a temperature of 60° C., and a capacity retention ratio and a direct current internal resistance (DCIR) during a period of time for the storage were measured.

Figure 4:
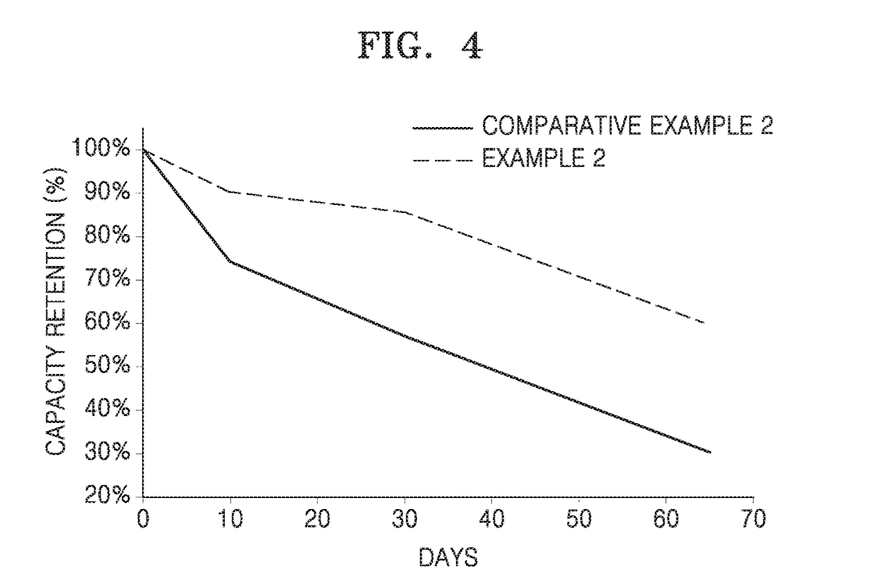
FIG. 4 shows measurement results of the capacity retention rate of the mini full-cells prepared in Example 2 and Comparative Example 2 when the mini full-cells are stored for a period of time at a temperature of 60° C.
Figure 5:
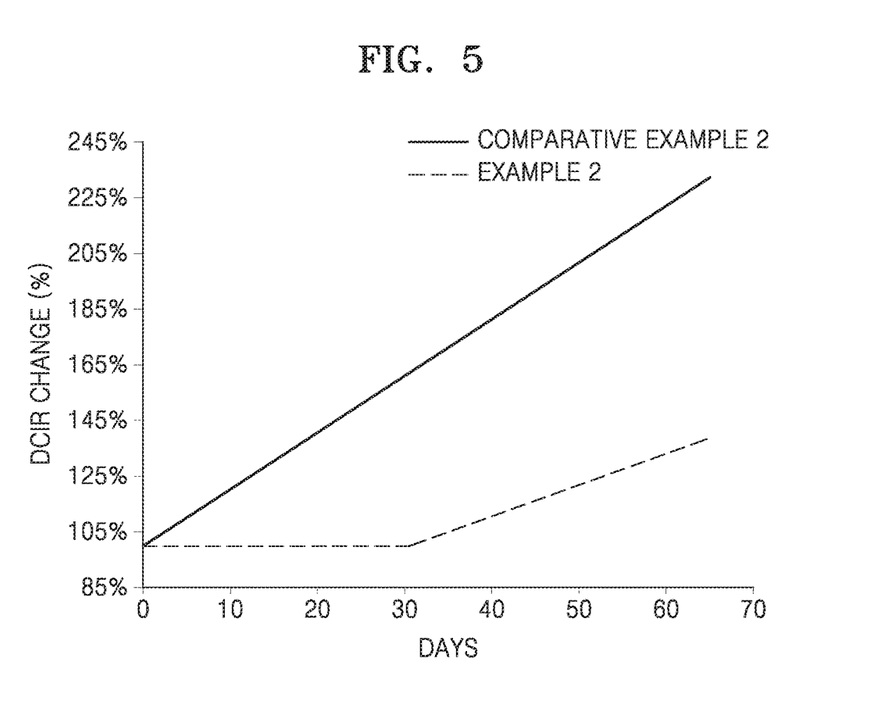
FIG. 5 shows measurement results of the direct current internal resistance (DCIR) of the mini full-cells prepared in Example 2 and Comparative Example 2 when the mini full-cells are stored for a period of time at a temperature of 60° C.

The capacity retention ratios and the DCIRs of the mini full-cells prepared in Example 2 and Comparative Example 2 during a period of time for the storage at a temperature of 60° C. were measured, and the results are shown in FIGS. 4 and 5, respectively.

As shown in FIGS. 4 and 5, the cell prepared in Example 2 including fluorosulfonyl isocyanate had significantly improved high temperature storage characteristics compared to those of the cell without an additive.

Evaluation Example 3: Evaluation of High Temperature Lifetime Characteristics The mini full-cell was charged at a constant current of 0.2 C rate until a voltage reached about 4.2 V and discharged at a constant current of 0.2 C rate until a voltage reached about 2.8 V at a temperature of 25° C. Next, the cell was charged at a constant current of 0.5 C rate until a voltage reached about 4.2 V, and, while maintaining the voltage at 4.2 V, the cell was charged at a constant voltage until a current reached 0.05 C. Then, the cell was discharged at a constant current of 0.5 C until a voltage reached about 2.8 V (formation process).

The mini-full cell after the formation process was charged at a constant current of 1 C rate until a voltage reached about 4.2 V, and, while maintaining the voltage at 4.2 V, the cell was charged at a constant voltage until a current reached about 0.05 C at a temperature of 45° C. Then, the cell was discharged at a constant current of 1 C until a voltage reached about 2.8 V, and the cycle including the charging and discharging process was repeated 500 times.

A discharge capacity at each cycle of each of the mini full-cells was measured, and a capacity retention ratio (%) according to Equation 1 was calculated by using the discharge capacity.

$$\text{Capacity retention ratio [\%]} = [\text{discharge capacity at each cycle/discharge capacity at } 1^{st} \text{ cycle}] \times 100 \quad \text{Equation 1}$$

Figure 6:
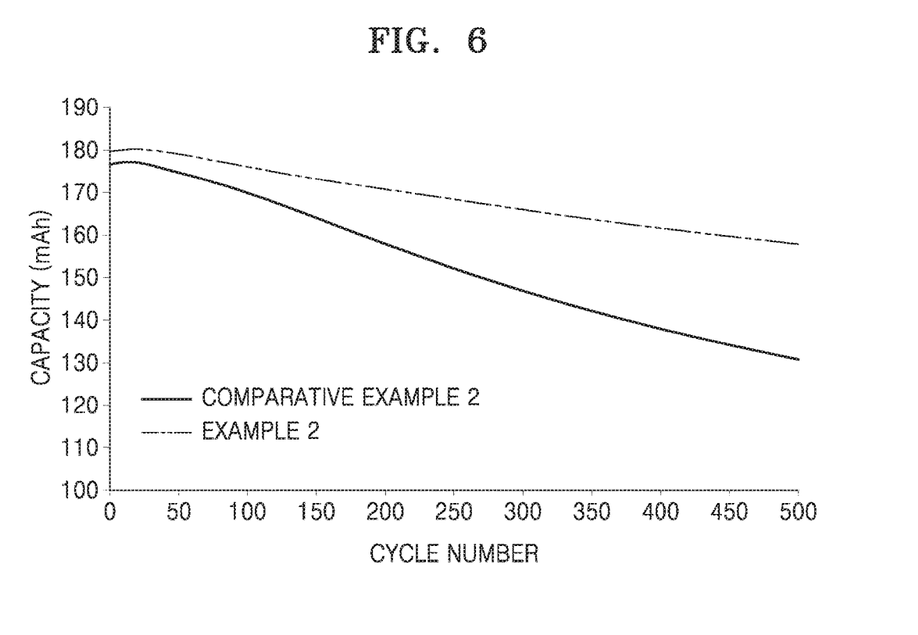
FIG. 6 is a graph illustrating a discharge capacity per cycle at a temperature of 45° C. of the mini full-cells prepared in Example 2 and Comparative Example 2.
Figure 7:
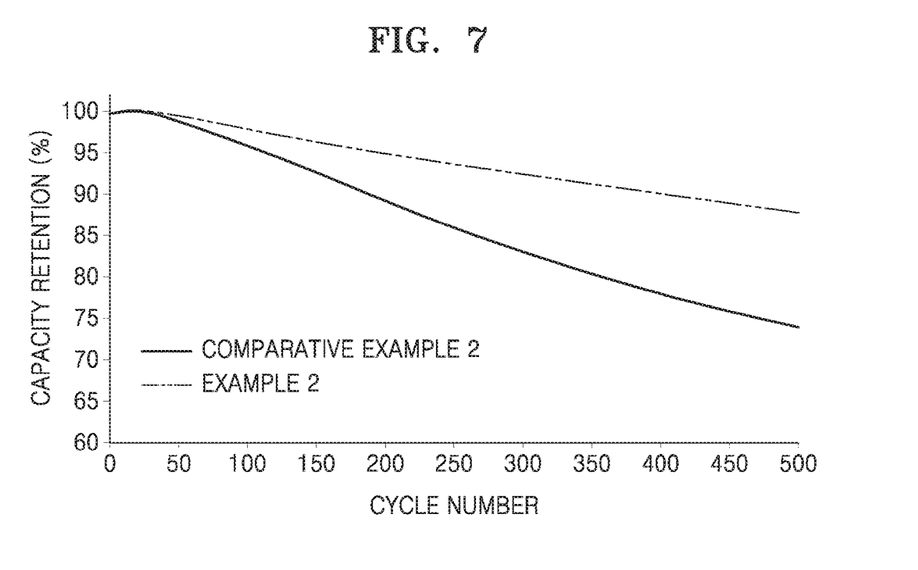
FIG. 7 is a graph illustrating a capacity retention rate per cycle at a temperature of 45° C. of the mini full-cells prepared in Example 2 and Comparative Example 2.

The results of measuring the discharge capacity and the capacity retention ratio at each charging/discharging cycle of the mini full-cells prepared in Example 2 and Comparative Example 2 are shown in FIGS. 6 and 7, respectively.

As shown in FIGS. 6 and 7, the cell prepared in Example 2 including fluorosulfonyl isocyanate had significantly improved discharge capacities and capacity retention ratios per cycle compared to those of the cell prepared in Comparative Example 2 without an additive.

Example 3

$LiPF_6$ was added to a mixture solvent including ethylene carbonate (EC), ethyl methyl carbonate (EMC), and dimethyl carbonate (DMC) at a volume ratio of 20:10:70 so that a concentration of $LiPF_6$ in the mixture was 1.5 M. Fluorosulfonyl isocyanate was added as an additive to the mixture solvent at an amount of 0.05 wt % and 0.01 wt % to prepare electrolytes for Example 3-1 and Example 3-2, respectively.

A cathode active material powder having a composition of $LiNi_{0.88}Co_{0.105}Al_{0.015}O_2$ and a carbon conducting agent (Super-P available from Timcal Ltd., Bodio, Switzerland) were homogenously mixed at a weight ratio of 97.4:1.3, and then a polyvinylidene fluoride (PVDF) binder solution was added thereto to prepare a cathode active material slurry so that the cathode active material, the carbon conducting agent, and the binder have a weight ratio of 97.4:1.3:1.3. The cathode active material slurry was coated on an aluminum foil having a thickness of about 15 μm, and the foil was dried and roll-pressed to prepare a cathode.

Also, N-methyl pyrrolidone was added to a mixture including a Si—Ti—Ni-based Si-alloy (having an atomic ratio of Si:Ti:Ni=68:16:16 and an average particle diameter of 5 μm and graphite (at a ratio of graphite:Si-alloy=89:11), as an anode active material, a polyamideimide, as a binder, and Ketjen Black, as a conducting agent, at a weight ratio of the anode active material, binder, and conducting agent of 97.3:1.5:1.2 to control a viscosity so that an amount of solid in the solution was 60 wt %, and thus an anode slurry was prepared. A copper foil current collector having a thickness of 10 μm was coated with the anode slurry at a thickness of about 40 μm. The resultant was dried at room temperature and dried again at a temperature of 120° C. and roll-pressed to prepare an anode.

The cathode and the anode thus prepared and a polypropylene separator (Celgard 2320, Celgard LLC., North Carolina, USA) having a thickness of 20 μm were used and the electrolyte was injected thereto to prepare a 2016-type coin full-cell.

Comparative Example 3

A coin full-cell was prepared in the same manner as in Example 3, except that fluorosulfonyl isocyanate was not added.

Evaluation Example 4: Evaluation of High Temperature Lifetime Characteristics

The coin full-cells prepared in Examples 3-1 and 3-2 and Comparative Example 3 were each charged at a constant current of 0.2 C rate until a voltage reached about 4.2 V and discharged at a constant current of 0.2 C rate until a voltage reached about 2.5 V at a temperature of 45° C. Next, the cell was charged at a constant current of 0.2 C rate until a voltage reached about 4.2 V, and, while maintaining the voltage at 4.2 V, the cell was charged at a constant voltage until a current reached 0.05 C. Then, the cell was discharged at a constant current of 0.2 C until a voltage reached about 2.5 V (formation process).

The coin full-cell after the formation process was charged at a constant current of 0.7 C rate until a voltage reached about 4.2 V, and, while maintaining the voltage at 4.2 V, the cell was charged at a constant voltage until a current reached about 0.05 C at a temperature of 45° C. Then, the cell was discharged at a constant current of 1.0 C until a voltage reached about 2.5 V, and the cycle including the charging and discharging process was repeated 200 times.

Figure 8:
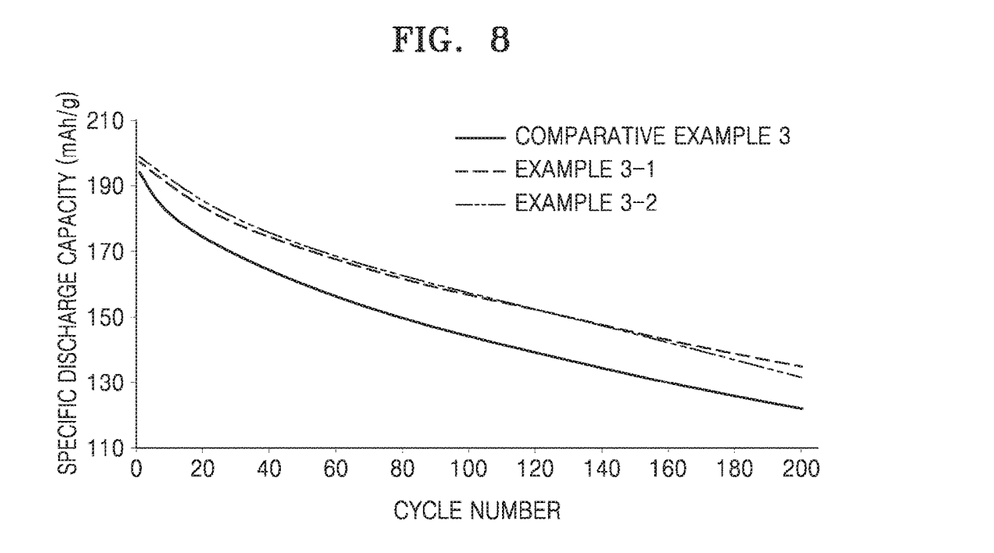
FIG. 8 is a graph illustrating a discharge capacity per cycle at a temperature of 45° C. of the coin full-cells prepared in Examples 3-1 and 3-2 and Comparative Example 3.
Figure 9:
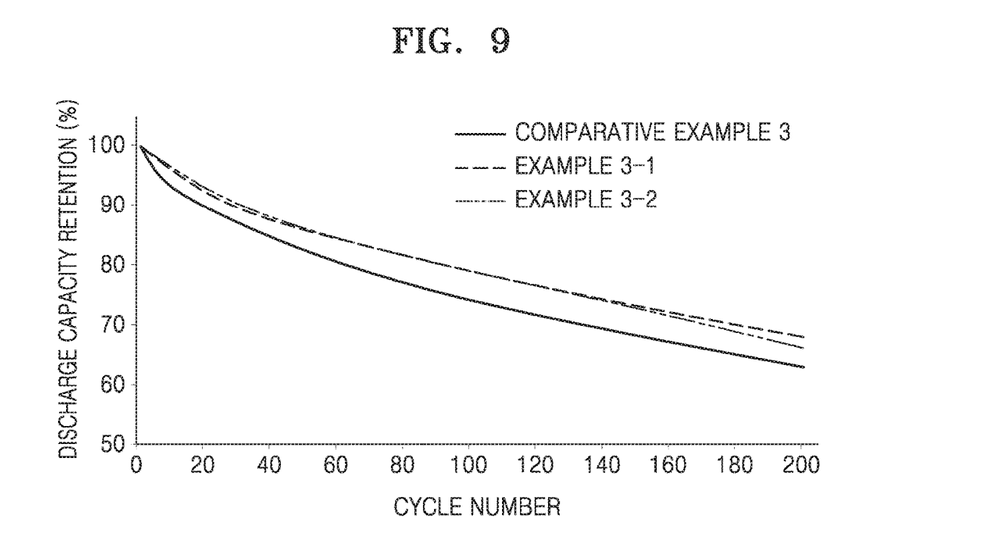
FIG. 9 is a graph illustrating a capacity retention rate per cycle at a temperature of 45° C. of the coin full-cells prepared in Examples 3-1 and 3-2 and Comparative Example 3.

The results of measuring the discharge capacity and the capacity retention ratio at each charging/discharging cycle of the coin full-cells prepared in Examples 3-1 and 3-2 and Comparative Example 3 are shown in FIGS. 8 and 9, respectively.

As shown in FIGS. 8 and 9, the cells prepared in Examples 3-1 and 3-2 including fluorosulfonyl isocyanate had significantly improved discharge capacities and capacity retention ratios per cycle compared to those of the cell prepared in Comparative Example 3 without an additive.

As described above, according to the one or more of the above embodiments of the present disclosure, storage and lifetime characteristics of a lithium battery at high temperatures may improve by adding the electrolyte additive for a lithium battery according to the embodiments to an electrolyte.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

In the present disclosure, the terms "Example", "Comparative Example", and "Evaluation Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:
1. An electrolyte additive for a lithium battery, the electrolyte additive comprising a sulfone compound wherein the sulfonyl group is directly bonded to a halide and an electron withdrawing group; and wherein the sulfone compound is selected from the group consisting of:

-continued

2. An electrolyte for a lithium battery, the electrolyte comprising:
a non-aqueous organic solvent; and
the electrolyte additive of claim 1.

3. The electrolyte of claim 2, wherein an amount of the sulfone compound as an electrolyte additive is in a range of about 0.001 wt % to about 10 wt % based on a total weight of the electrolyte.

4. The electrolyte of claim 2, wherein an amount of the sulfone compound as an electrolyte additive is in a range of about 0.0015 wt % to about 5 wt % based on a total weight of the electrolyte.

5. The electrolyte of claim 2, the electrolyte further comprising a lithium salt.

6. The electrolyte of claim 2, wherein the non-aqueous organic solvent is selected from the group consisting of a carbonate-based compound, an ester-based compound, an ether-based compound, a ketone-based compound, an alcohol-based compound, and an aprotic solvent.

7. The non-aqueous solvent of claim 6, wherein the carbonate-based compound is selected from the group consisting of a cyclic carbonate-based compound, acyclic carbonate-based compound, and a mixture of the cyclic and acyclic carbonate-based compound.

8. The non-aqueous solvent of claim 7, wherein the acyclic carbonate-based compound is selected from the group consisting of diethyl carbonate (DEC), dimethyl carbonate (DMC), dipropyl carbonate (DPC), methyl propyl carbonate (MPC), ethyl propyl carbonate (EPC), and ethyl methyl carbonate (EMC).

9. The non-aqueous solvent of claim 7, wherein the cyclic carbonate-based compound is selected from the group consisting of ethylene carbonate (EC), propylene carbonate (PC), butylene carbonate (BC), and vinyl ethylene carbonate (VEC).

10. The non-aqueous solvent of claim 7, wherein the cyclic carbonate-based compound and acyclic carbonate-based compound are mixed together in a volume ratio of about 1:1 to about 1:9.

11. A lithium battery comprising:
a cathode;
an anode; and
the electrolyte of claim 2 between the cathode and the anode.

12. The lithium battery according to claim 11, wherein the electrolyte comprising an amount of the sulfone compound as an electrolyte additive is in a range of about 0.001 wt % to about 10 wt % based on a total weight of the electrolyte.

13. The lithium battery according to claim 11, wherein the electrolyte further comprises a lithium salt.

14. The lithium battery according to claim 11, wherein the electrolyte comprising the non-aqueous organic solvent is selected from the group consisting of a carbonate-based compound, an ester-based compound, an ether-based compound, a ketone-based compound, an alcohol-based compound, and an aprotic solvent.

15. The lithium battery according to claim 11, wherein the electrolyte comprising the carbonate-based compound is selected from the group consisting of a cyclic carbonate-based compound, acyclic carbonate-based compound, and a mixture of the cyclic and acyclic carbonate-based compound.

16. The lithium battery according to claim 11, wherein the electrolyte comprising the acyclic carbonate-based compound is selected from the group consisting of diethyl carbonate (DEC), dimethyl carbonate (DMC), dipropyl carbonate (DPC), methyl propyl carbonate (MPC), ethyl propyl carbonate (EPC), and ethyl methyl carbonate (EMC).

17. The lithium battery according to claim 11, wherein the electrolyte comprising the cyclic carbonate-based compound is selected from the group consisting of ethylene carbonate (EC), propylene carbonate (PC), butylene carbonate (BC), and vinyl ethylene carbonate (VEC).

18. The lithium battery according to claim 11, wherein the electrolyte comprising the cyclic carbonate-based compound and acyclic carbonate-based compound are mixed together in a volume ratio of about 1:1 to about 1:9.

* * * * *